United States Patent
Jang et al.

(10) Patent No.: US 9,471,219 B2
(45) Date of Patent: Oct. 18, 2016

(54) TEXT RECOGNITION APPARATUS AND METHOD FOR A TERMINAL

(71) Applicant: Samsung Electronics Co., Ltd., Gyeonggi-do (KR)

(72) Inventors: Sihak Jang, Gyeonggi-do (KR); Seonhwa Kim, Seoul (KR); HeeJin Kim, Seoul (KR); Mijung Park, Gyeonggi-do (KR)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 100 days.

(21) Appl. No.: 13/972,324

(22) Filed: Aug. 21, 2013

(65) Prior Publication Data

US 2014/0062962 A1  Mar. 6, 2014

(30) Foreign Application Priority Data

Aug. 28, 2012  (KR) ........................ 10-2012-0094029

(51) Int. Cl.
| | |
|---|---|
| G06F 3/0488 | (2013.01) |
| G06K 9/20 | (2006.01) |
| G06F 3/0354 | (2013.01) |
| G06F 17/21 | (2006.01) |

(52) U.S. Cl.
CPC ....... *G06F 3/04883* (2013.01); *G06F 3/03545* (2013.01); *G06F 17/21* (2013.01); *G06K 9/2081* (2013.01); *G06F 2203/04807* (2013.01); *G06K 2209/01* (2013.01)

(58) Field of Classification Search
None
See application file for complete search history.

(56) References Cited

U.S. PATENT DOCUMENTS

| | | | |
|---|---|---|---|
| 2003/0120478 A1 | 6/2003 | Palmquist | |
| 2003/0185448 A1* | 10/2003 | Seeger et al. | 382/229 |
| 2006/0142054 A1 | 6/2006 | Wang et al. | |
| 2007/0300142 A1* | 12/2007 | King et al. | 715/500 |
| 2008/0118162 A1* | 5/2008 | Siegemund | 382/229 |
| 2011/0066421 A1* | 3/2011 | Lee et al. | 704/2 |
| 2011/0081083 A1* | 4/2011 | Lee et al. | 382/182 |
| 2011/0081948 A1* | 4/2011 | Shirai | G06T 11/60 455/556.2 |
| 2011/0123115 A1 | 5/2011 | Lee et al. | |
| 2011/0249900 A1* | 10/2011 | Thorn et al. | 382/195 |
| 2012/0131520 A1 | 5/2012 | Tang et al. | |

OTHER PUBLICATIONS

Xiamen Scan Technology: ScanDic—Camera Translator for Android Phones, Mar. 18, 2011, XP054975655, Retrieved from the Internet: https://www.youtube.com/watch?v=lglXbo_XRd0.

IntSig: CamDictionary, Aug. 25, 2011, XP055159464, Retrieved from the Internet: https://play.google.com/store/apps/details?id=com.intsig.license.camdict.

Inaba5817 Channel: Cam Dictionary, Dec. 17, 2011, XP054975656, Retrieved from the Internet: https://www.youtube.com/watch?v=j0E0cXqePB0.

* cited by examiner

*Primary Examiner* — Vu Le
*Assistant Examiner* — Alexander J Lesnick
(74) *Attorney, Agent, or Firm* — Cha & Reiter, LLC (57) ABSTRACT

A text recognition apparatus and method of the portable terminal is provided for recognizing text image selected by a pen on a screen image as text. The text recognition method of the present invention includes displaying an image; configuring a recognition area on the image in response to a gesture made with a pen; recognizing text in the recognition area; displaying the recognized text and action items corresponding to the text; and executing, when one of the action items is selected, an action corresponding to the selected action item.

11 Claims, 11 Drawing Sheets

TEXT RECOGNITION APPARATUS AND METHOD FOR A TERMINAL

CLAIM OF PRIORITY

This application claims the benefit under 35 U.S.C. §119(a) of a Korean patent application filed on Aug. 28, 2012 in the Korean Intellectual Property Office and assigned Serial No. 10-2012-0094029, the entire disclosure of which is hereby incorporated by reference.

BACKGROUND

1. Field of the Invention

The present disclosure relates to a portable terminal and, in particular, to a text recognition apparatus and method for recognizing text displayed on a screen image using a touch pen.

2. Description of the Related Art

A portable terminal is typically equipped with a touch panel that the user can control through simple or multi-touch gestures and a camera for capturing an image. Many recent portable terminals are now provided with include text and speech recognition functions to increase user's experience.

A touch panel senses an input using a finger or a touch pen. The former type touch panel can be implemented as a capacitive touch panel, and the latter type touch panel as an electro-magnetic resonance (EMR) touch panel. The touch pen can be implemented as a capacitive type touch pen as well as an EMR type touch pen. In the case of using the capacitive type touch pen, the capacitive touch panel is capable of sensing the touch inputs made by both the human body (e.g. finger) and the capacitive type touch pen.

Recently, there is a demand for recognizing the text in an image taken by the camera in real time. That is, there is a need of a method for recognizing the text included in a preview image captured by the camera and taking an action according to the recognition outcome.

SUMMARY

The present invention provides a text recognition apparatus and method for use in a portable terminal equipped with a camera and a touch panel capable of locating the position of at least one text designated by a touch pen on an image (preview image, still image, etc.) and recognizing a character image at the position selected by the contact during a text recognition mode.

Another aspect of the invention provides a text recognition apparatus and method for use in a portable terminal where at least one text contact made by a touch pen or pointed by hovering gesture thereon for initiating a character recognition during a text recognition mode.

Another aspect of the invention provides capturing of a preview image as a still image in response to a pen touch or pen hovering gesture without the contact, so that the text recognized using the pen action is displayed along with a list of executable items corresponding to the recognized text for selection.

In accordance with an aspect of the present invention, a text recognition method of a terminal includes displaying an image; configuring or defining a recognition area on the image in response to an input gesture using an object; recognizing at least one text in the recognition area; and displaying the recognized text and a list of selectable action items corresponding to the text for selection.

In accordance with another aspect of the present invention, a text recognition apparatus of a terminal includes a camera providing an image; a touch panel detecting an input gesture made using an object; a display unit displaying the captured image; and a control unit controlling the display unit for configuring or defining a recognition area on the image in response to the input gesture, recognizing at least one text in the recognition area, and displaying the recognized text and a list of selectable action items corresponding to the text.

DETAILED DESCRIPTION

Exemplary embodiments of the present invention are described with reference to the accompanying drawings in detail. The same reference numbers are used throughout the drawings to refer to the same or like parts.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In an embodiment of the present invention, the terminal equipped with a camera and a pen touch-sensitive touch panel is capable of selecting the position contacted by a touch pen on an image (preview image, still image, etc.) and recognizing text image at the selected position. To achieve this, the terminal includes a touch panel sensitive to a pen touch that is capable of sensing the touch or hovering gesture made on or above the touch panel with or without contact thereon.

In an embodiment of the present invention, the terminal operating in a preview mode is capable of capturing a preview image as a still image in response to a pen touch gesture. If a pen touch gesture or hovering gesture over the touch panel is detected, the terminal analyzes the image at the position where the pen touch or hovering gesture is detected and recognizes the character according to the analysis result and then display a list of items executable corresponding to the recognized character. According to an embodiment of the present invention, if a pen touch gesture is detected in the state of displaying the preview image captured by the camera, the terminal recognizes the text image at the position of the pen touch, displays the recognized character data and at least one action item corresponding to the recognized character data, and executing, if the user selects an action item, the function corresponding to the selected action item.

According to an embodiment of the present invention, if a pen touch gesture is detected in the state of displaying a still image, the terminal recognizes text image near where the pen touch is detected, displays the recognized character data and at least one action item corresponding to the character data, and executes, if the user selects an action item, the function corresponding to the selected action item.

Figure 1:
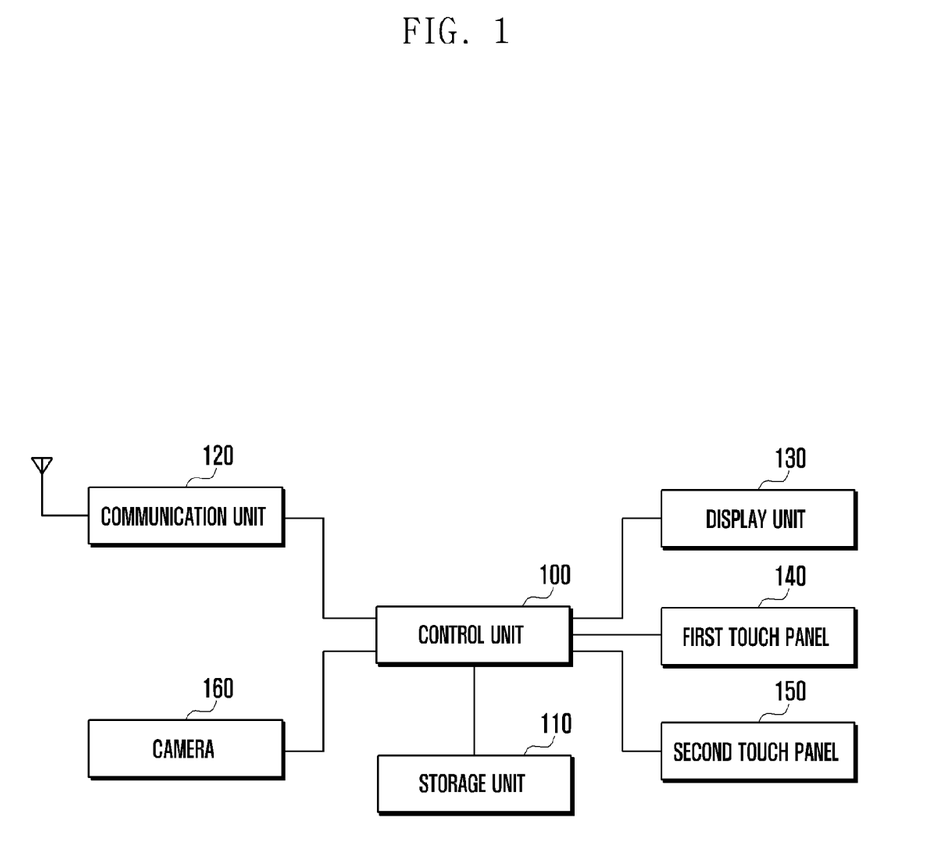
FIG. 1 is a block diagram illustrating the configuration of the terminal according to an embodiment of the present invention.

FIG. 1 is a block diagram illustrating the configuration of the terminal according to an embodiment of the present invention. Here, the terminal can be any of various digital devices such as a mobile terminal including smartphone, MP3 player, tablet PC, and desktop/laptop PC.

Referring to FIG. 1, the communication unit 120 is responsible of radio communication with a base station or another terminal. Here, the communication unit 120 may include a transmitter for up-converting and amplifying the signal to be transmitted and a receiver for low noise amplifying and down converting the received signal. The communication unit 120 may include a modulator and demodulator. The modulator modulates the transmission signal which is transferred to the transmitter, and the demodulator demodulates the signal received by the receiver. The modulator/demodulator can be any of LTE, WCDMA, GSM, Wi-Fi, WiBro, NFC, Bluetooth modulators/demodulators. In an embodiment of the present invention, the description is made under the assumption that the communication unit 120 includes the LTE, Wi-Fi, and Bluetooth communication modules.

The camera 160 is responsible for taking an image in response to a camera driving command.

The control unit 100 controls overall operations of the terminal and, in the text recognition mode, recognizes the character at the focused position of a preview image provided by the camera 160 and the character included in the screen image captured in response to a capture request. In the text recognition mode, the control unit 100 checks the function configured in the text recognition mode, displays the action item corresponding to the recognized character in association with the function, and controls execution of the action corresponding to the item selected by the user.

The memory 110 includes a program memory for storing Operation System (OS) of the terminal and application programs associated with the method according to an embodiment of the present invention a data memory for storing tables associated with the operations of the terminal and data by the programs.

The display unit 130 displays information on the application running currently under the control of the control unit 100. The display unit 130 can be implemented with one of Liquid Crystal Display (LCD) and Organic Light Emitting Diode (OLED). The first touch panel 140 can be implemented in capacitive type or resistive time to generate position information of a touch (hereinafter, assumed as a finger touch) to the control unit 100. The second touch panel 150 is provided with an EMR sensor pad to detect a pen touch and generate a corresponding input signal to the control unit 100. Here, the display unit 130, touch panel 140, and ERM panel 150 can be integrated into a signal device.

In the above-configured terminal, if a touch input is detected at a particular position of the image displayed on the screen of the terminal, the control unit 100 configures or defines the area near the pen touch location as a recognition region and recognizes character data or text(s) defined in the recognition region, then display the recognized character data along with the menu (hereinafter, referred to executable or action item) for performing a function corresponding to the character. Recognizing texts from a preview screen or a still image captured by a camera is well known in the art that can be performed in a variety of ways.

Figure 2:
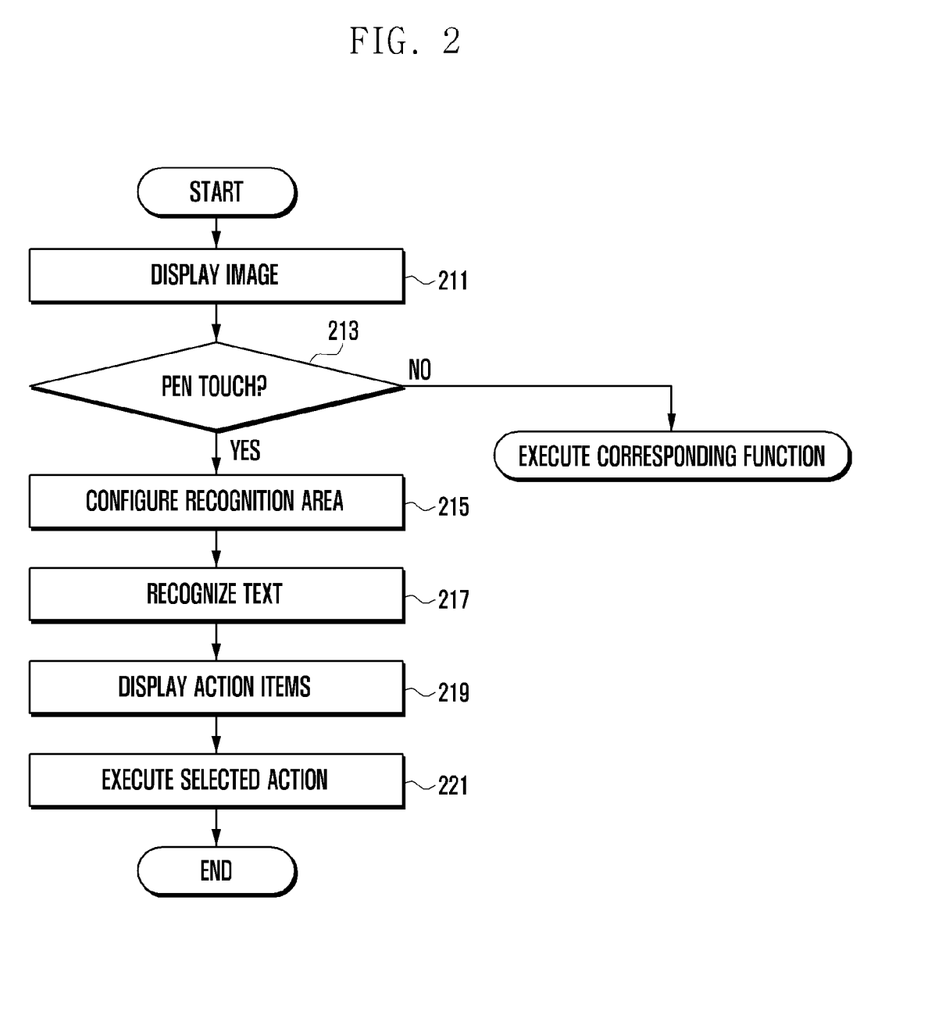
FIG. 2 is a flowchart illustrating the process of recognizing and processing text in an image displayed on the screen of the terminal according to an embodiment of the present invention.
Figure 3:
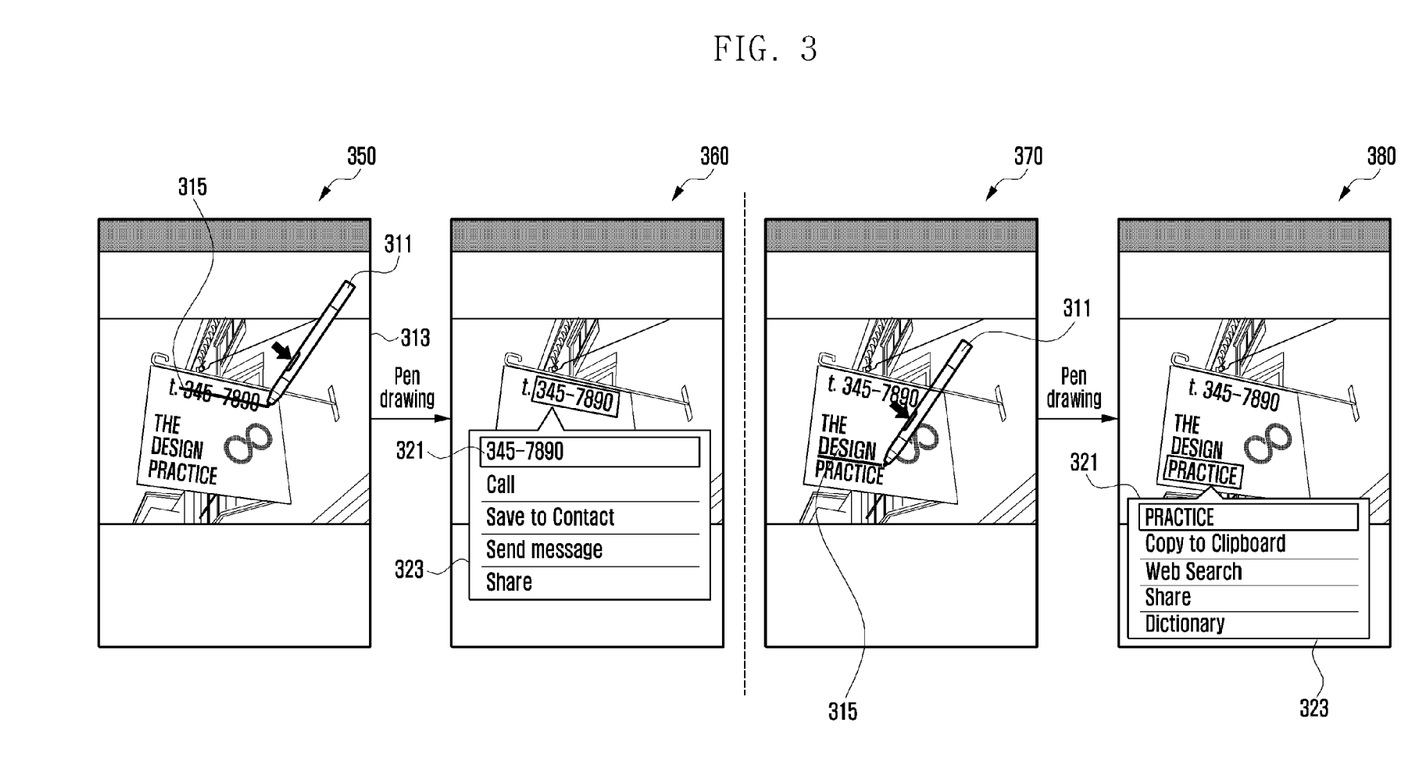
FIG. 3 is a diagram illustrating exemplary screen images displayed by the terminal operating in the text recognition mode according to an embodiment of the present invention.

FIG. 2 is a flowchart illustrating the process of recognizing and processing text in an image displayed on the screen of the terminal according to an embodiment of the present invention. FIG. 3 is a diagram illustrating exemplary screen images displayed by the terminal operating in the text recognition mode according to an embodiment of the present invention.

Referring to FIGS. 2 and 3, the control unit 100 controls the display unit 130 to display an image at step 211. Note that the displayed image can be received in the terminal from an exterior source, such as another terminal, internet, cloud, server, etc. At this time, the image displayed by the display unit 130 can be an image including a picture and characters or only characters (e.g. document image). If the user makes a touch input or gesture by means of a pen on the image, the control unit 100 detects the pen contact by means of the second touch panel 150 at step 213 and checks the position of the pen contact detected by the second touch panel 150 to perform text recognition at step 215. That is, if a user draws a line by means of the pen 311 as denoted by reference number 315 on the image as shown in the exemplary screen images 350 and 370 of FIG. 3, the control unit 100 detects the pen gesture by means of the second touch panel 150 and configures the area around the pen drawing (pen drawing area) as a recognition area. Alternatively, the word displaced either above or below between the underlined 315 can be recognized according to the embodiment of the present invention. Next, the control unit 100 recognizes the characters in the recognition area and displays the recognized character(s) 321 and action item 323 in the form of a popup window as shown in the exemplary screen images 360 and 380 according to the analysis result at step 219.

In FIG. 3, the screen image 350 shows an exemplary case where the pen drawing is made onto a phone number in the image, and the screen image 370 shows an exemplary case where the pen drawing is made onto text of the image. In an embodiment of the present invention, it is assumed that the text is classified into one of the linkage text with certain link information and normal text without link information. In this case, the linkage text with link information can be any of Uniform Resource Locator (URL), email, phone number, address, and Social Network Service (SNS) identity information. If such a linkage text is recognized, the control unit 100 is capable of displaying the action items (menu items) executable with the link information. Here, the action items of the linkage text can be summarized as shown in table 1.

TABLE 1

| Link information | Action items |
| --- | --- |
| e-mail | send email, add to contact(view contact), share |
| phone | call, send message, add to contact(view contact), share |
| URL | open URL, add to book mark, share |

In the case of the normal text, the control unit 100 is capable of displaying the action items 323 such as 'copy to clipboard', 'web search', 'share', 'dictionary', etc.

Thereafter, in the state of displaying the action items corresponding to the text at the recognition region configured in response to a pen touch, the control unit 100 serves the action corresponding to the selected action item at step 221.

Figure 4A:
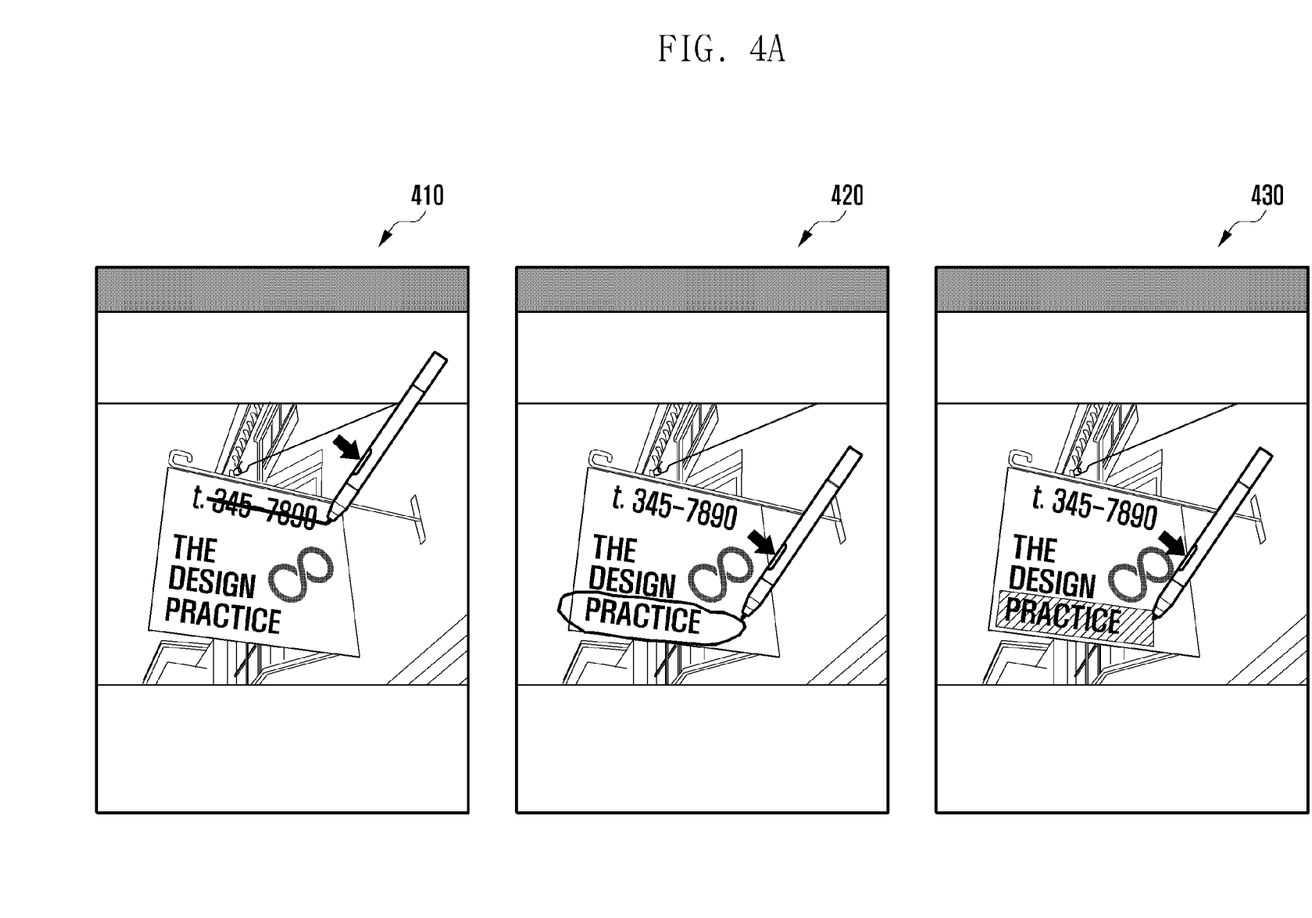
FIGS. 4a and 4b are diagrams illustrating exemplary screen images for explaining configuration of the recognition area in response to the pen gesture input in the text recognition method according to an embodiment of the present invention.
Figure 4B:
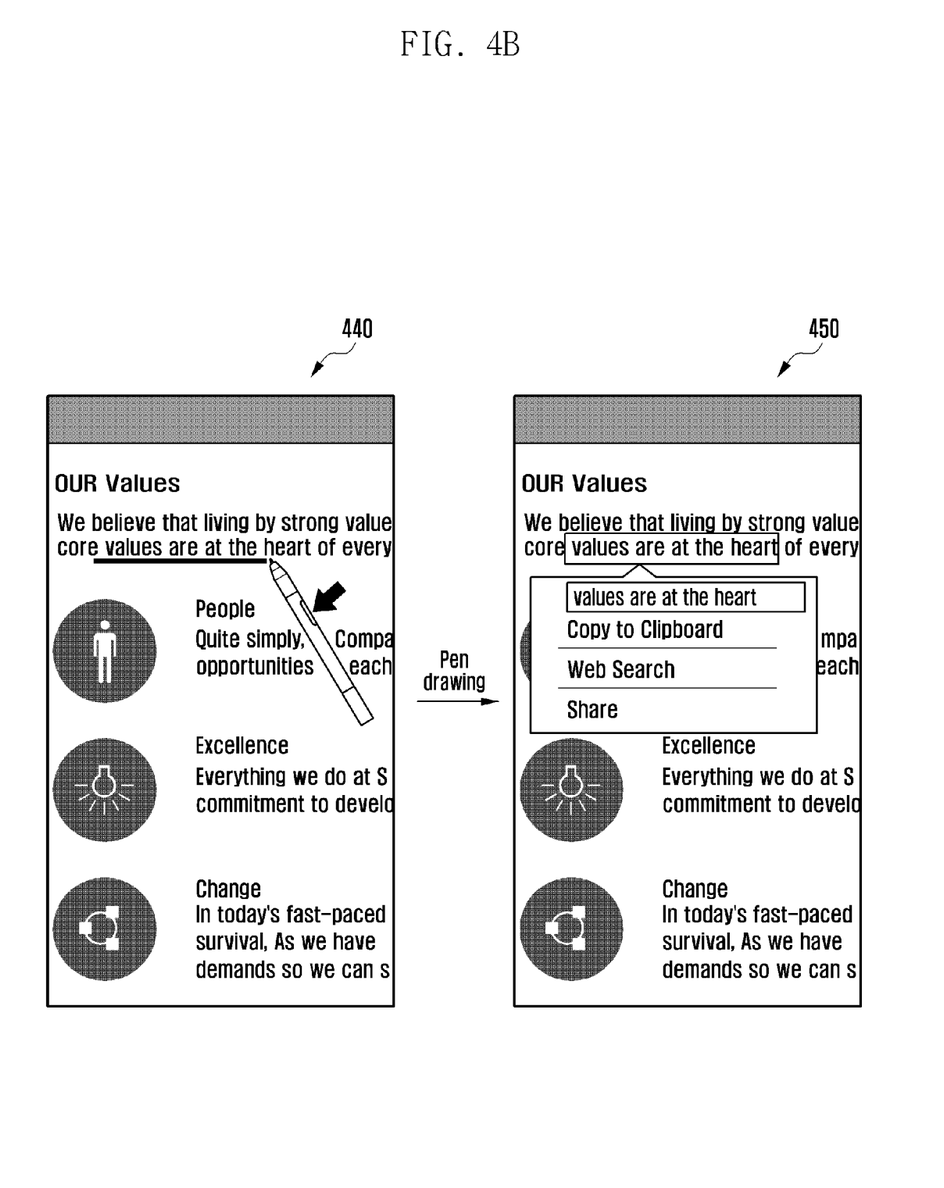

Meanwhile, the pen touch-based text recognition area configuration can be performed in various ways at steps 213 and 215. That is, the control unit 100 detects the text selected by pen and performs the recognition in unit of word or line. FIGS. 4a and 4b are diagrams illustrating exemplary screen images for explaining configuration of the recognition area in response to the pen gesture input during the text recognition method according to an embodiment of the present invention.

Referring to FIG. 4a, the recognition area can be configured in response to the pen touch gesture of underlining a text as denoted by reference number 410, drawing a closed curve as denoted by reference number 420, or highlighting with the pen as denoted by reference number 430. In the case of underlining the text, if a line is drawn between two text strings with short letter-spacing, the control unit 100 recognizes one or both of the text strings. In an embodiment of the present invention, it is assumed that the text string above the drawn line is recognized and processed.

Referring to FIG. 4b, in the case of configuring the recognition with the pen as shown in the screen image 440 (reference number 410 shows the exemplary case where the touch input is made by drawing a cross line on the text), the underline drawn by the pen may end in the middle of a sentence. In this case, the control unit 100 configures the recognition region such that the words on the underlined are included in the recognition region. Accordingly, if the pen touch input is made as shown in the screen image 440 of FIG. 4b, the control unit 100 configures the recognition area to recognize the text along with the display of the action items as shown in the screen image 450.

Figure 5:
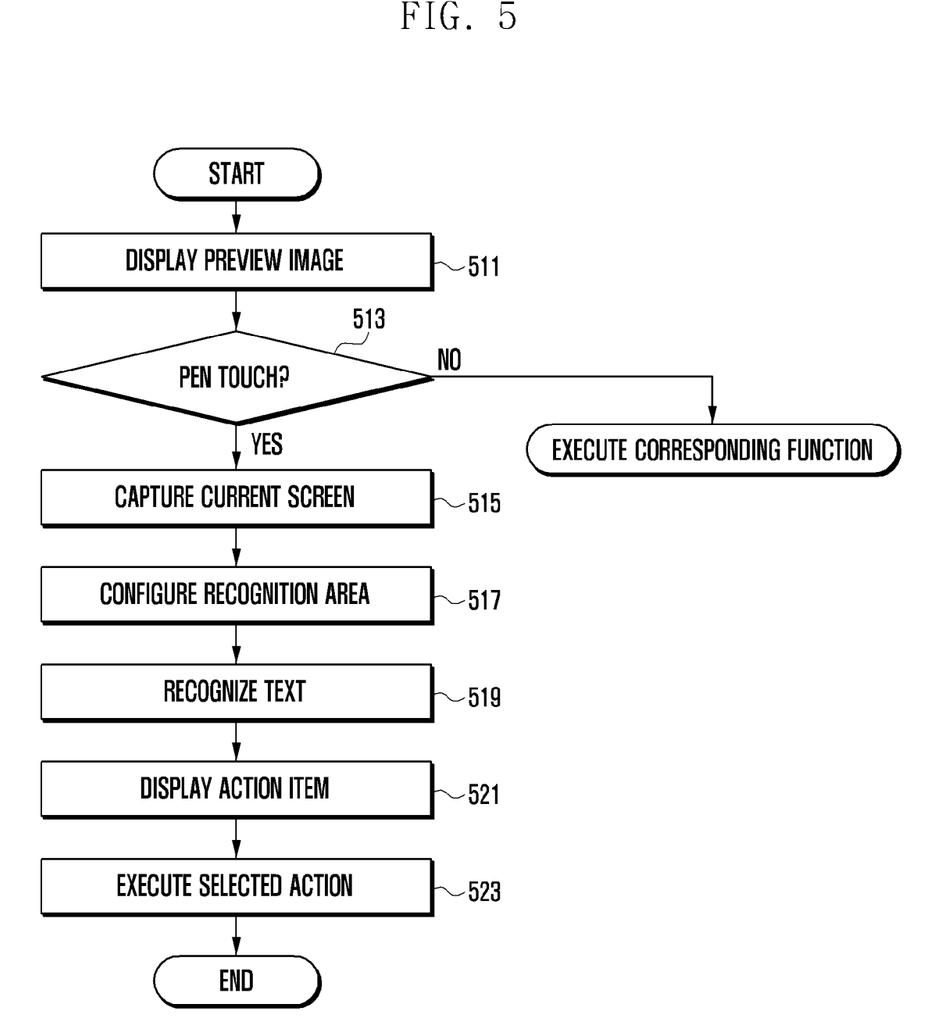
FIG. 5 is a flowchart illustrating the pen touch-based text recognition method for a terminal operating in the preview mode according to an embodiment of the present invention.
Figure 6A:
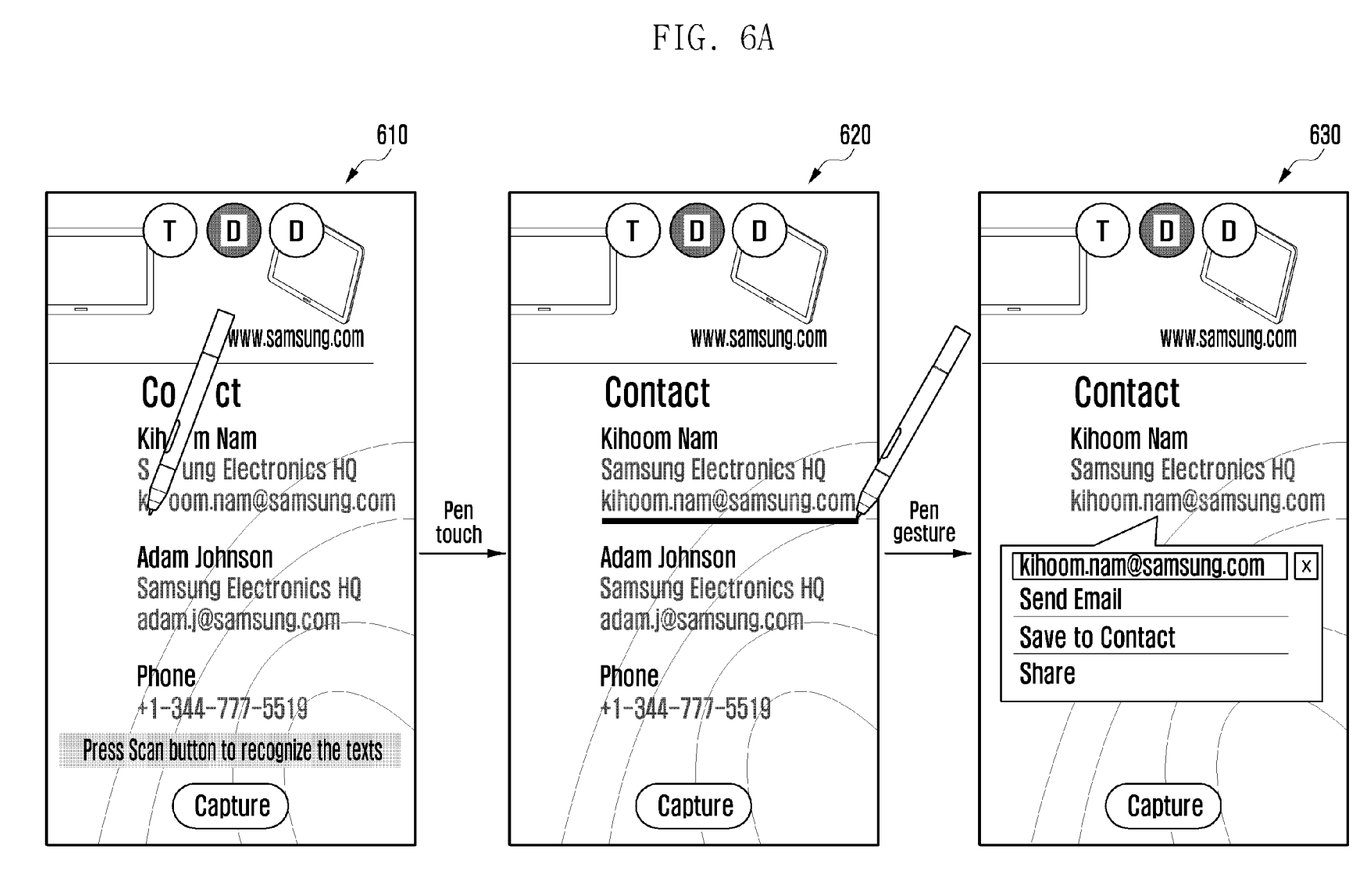
FIGS. 6a and 6b are diagrams illustrating exemplary screen images for explaining the text recognition procedure of FIG. 5.
Figure 6B:
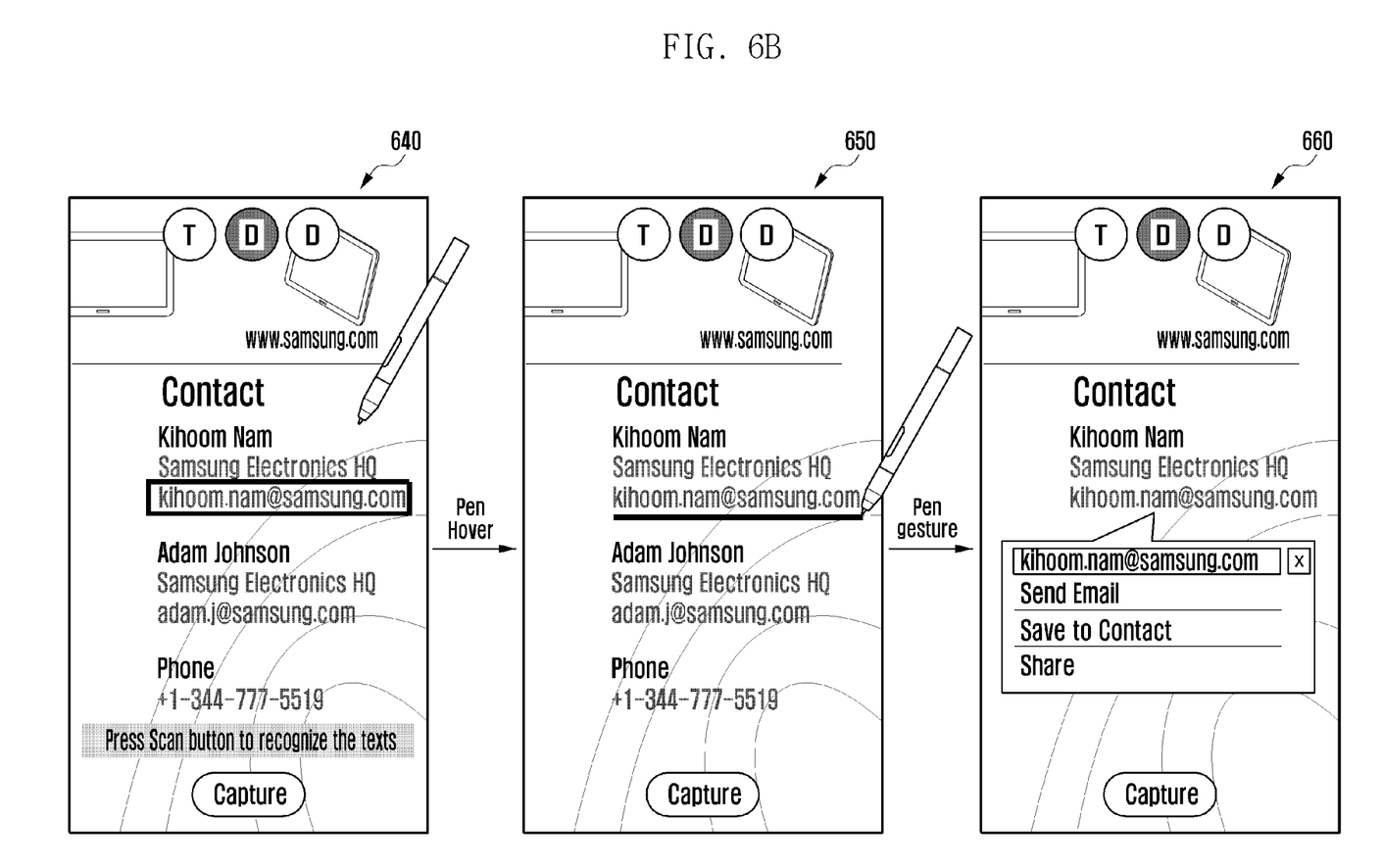

FIG. 5 is a flowchart illustrating the pen touch-based text recognition method for a terminal operating in a preview mode according to an embodiment of the present invention. FIGS. 6a and 6b are diagrams illustrating exemplary screen images for explaining the text recognition procedure of FIG. 5.

Referring to FIGS. 5, 6a, and 6b, the control unit 100 is capable of activating the text recognition mode in the state that the terminal is operating in the preview mode or activating the camera to enter the preview mode in the state that the text recognition mode is configured. In this state, the control unit 100 controls the display unit 130 to display the preview image (live image) provided by the camera 160 at step 511. The preview image provided by the camera 160 can be an image including picture and text, for example, a signboard picture or a document image including only text. If the user makes a pen touch on the preview image displayed by the display unit 130, the control unit 100 detects the pen touch input by means of the second touch panel 150 at step 513 and captures the preview image as a still image at step 515. Note that the preview image or still image can be received from an exterior source.

The reason for capturing the still image in this embodiment is because it is difficult to enter the pen touch input on the preview image itself due to the shake of the terminal. In order to provide a correct touch input without shake of the image, the control unit 100 captures the preview image as a still image, which is used to detect the pen touch input. Since it is difficult to make a correct pen touch input on the non-stationary preview image, the control unit 100 controls to capture the current screen image as a still image immediately upon detecting the pen touch input. As such, the display unit 130 displays the captured still image such that the user is capable of selecting the text on the still image by means of the pen without any shaking the image (e.g. in the state of holding the terminal by one hand or placing the terminal on a fixed object).

Accordingly, as shown in FIG. 6a, if a pen touch input is detected on the screen in the state that the preview image is displayed as denoted by reference number 610, the control unit 100 captures the preview image as a still image as denoted by reference number 620 such that the user can make a pen touch input onto the still image.

If the pen touch input has completed, the control unit 100 configures the text recognition area in the image based on the position of the pen touch detected by means of the second touch panel 150 at step 517. In the embodiment, the pen touch input can be made in the form of contact on or hovering above the screen as described earlier with reference to FIG. 4a.

Next, the control unit 100 recognizes the text within the text recognition area at step 519 and analyzes the recognized text and displays the text data and the corresponding action items in the form of a popup window according to the analysis result at step 521. Here, the action items can be changed depending on whether the recognized text is the linkage text or the normal text and, in the case of the linkage text, the action items can be provided as summarized in table 1. If one of the action items is selected by the user, the control unit 100 executes the action corresponding to the selected action item.

FIG. 6b is a diagram illustrating the exemplary screen images for explaining the operation of the terminal in response to a hovering gesture input made by a pen according to an alternate embodiment of the present invention. If the pen approaches into a predetermined range of the display unit 130 as shown in the screen image 640 of FIG. 6b, the second touch panel 150 detects the approach of the pen. If the hovering gesture input is detected, the control unit 100 controls to capture the preview image as a still image such that the user can draw underline and make other gesture stably. Note capturing of a still image can be achieved using a predesigned activation button on the terminal or an activation button provided in the touch pen.

Once the still image is displayed, the control unit 100 is capable of configuring an area selected with a certain pen's hovering gesture or underlined contact gesture as the text recognition area. The control unit 100 recognizes the text in the text recognition area and displays the recognized text data and the corresponding action items as shown in the screen image 660.

Figure 7:
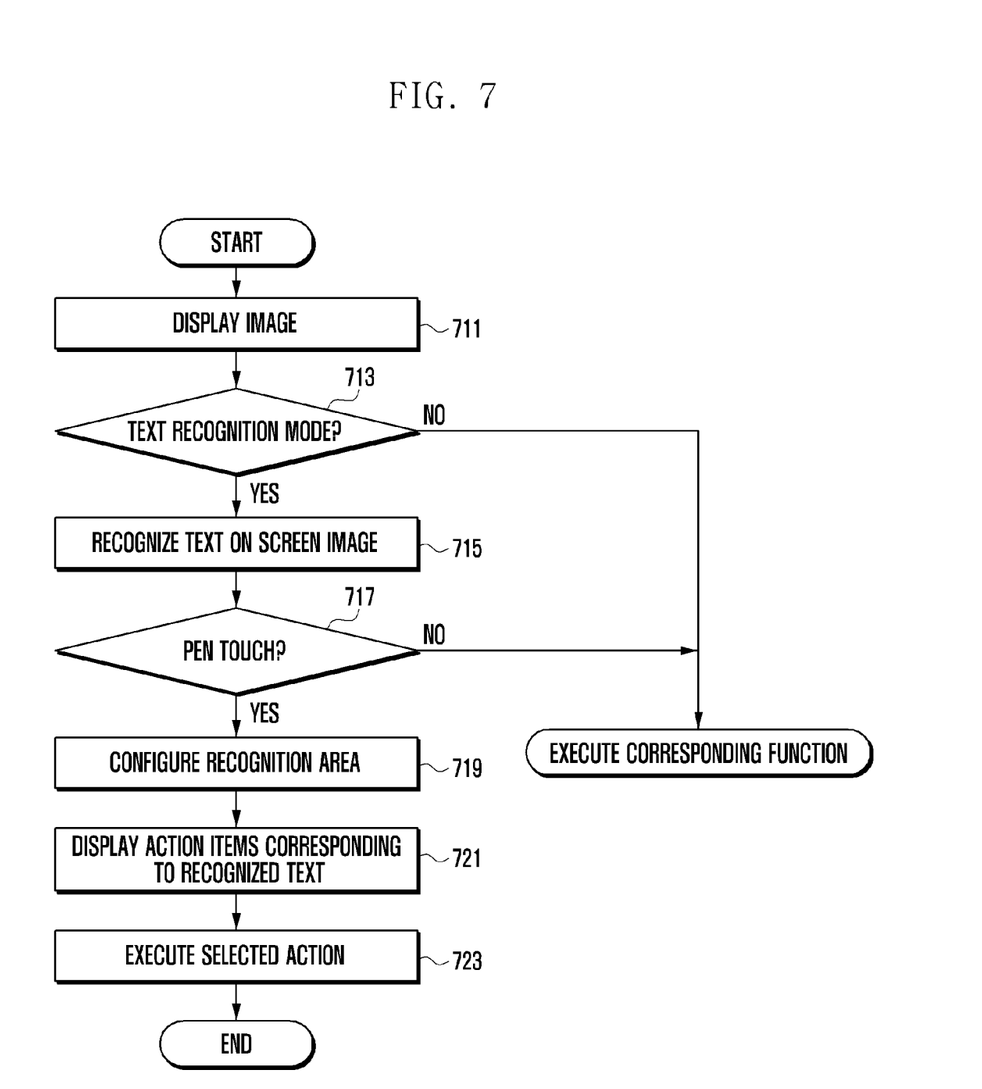
FIG. 7 is a flowchart illustrating the text recognition method according to an embodiment of the present invention.
Figure 8A:
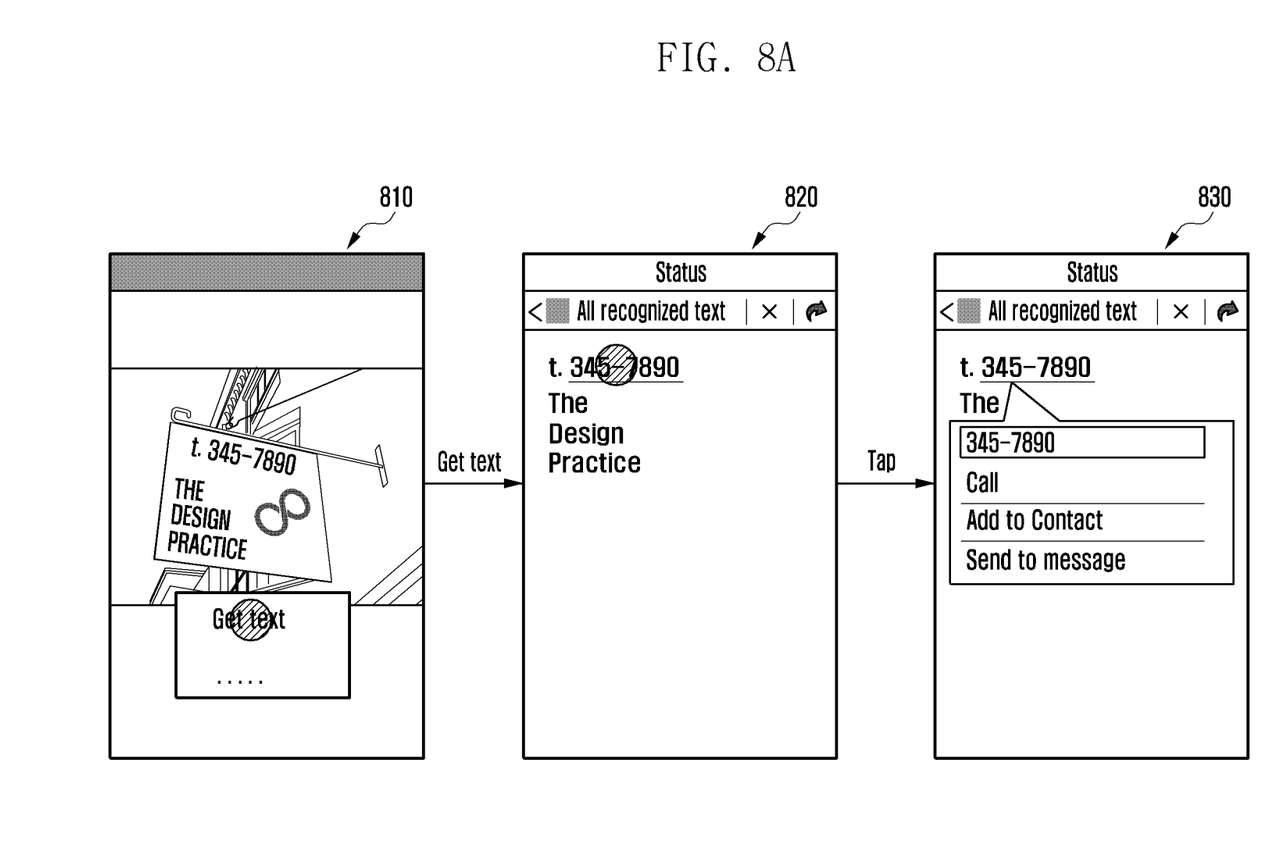
FIGS. 8a and 8b are the diagrams illustrating exemplary screen images for explaining the text recognition procedure of FIG. 7.
Figure 8B:
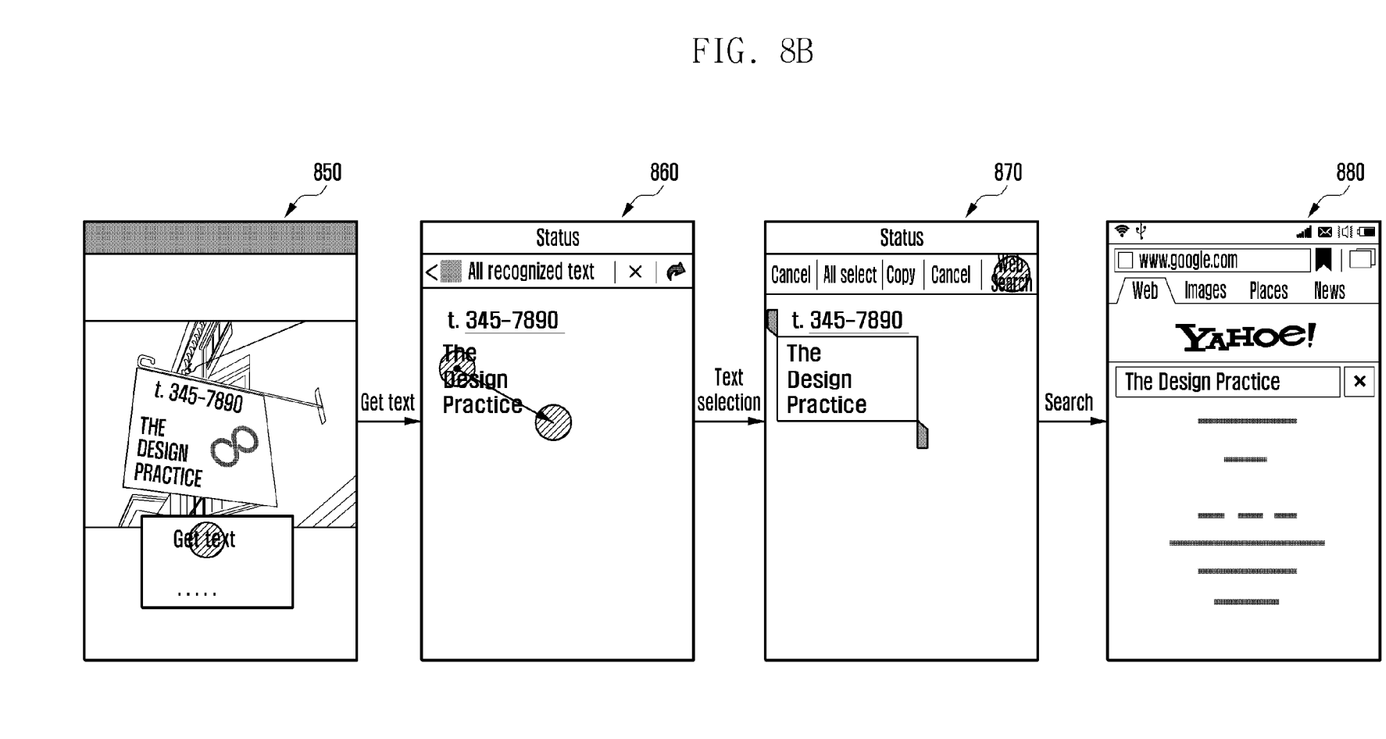

FIG. 7 is a flowchart illustrating the text recognition method according to another embodiment of the present invention. FIGS. 8a and 8b are the diagrams illustrating exemplary screen images for explaining the text recognition procedure of FIG. 7.

Referring to FIGS. 7, 8a, and 8b, the control unit 100 controls the display unit 130 to display an image at step 711. The image displayed at step 711 can be a still image captured by the camera 160 or received by communication unit 120. The image can be an image including a picture and text or a document image including only text. If the user enters a request for recognizing text as denoted by reference numbers 810 of FIGS. 8a and 850 of FIG. 8b (get text), the control unit 100 detects the user request at step 713 and recognizes and displays all the texts in the image at step 715. At this time, the text recognition can be executed in unit of word. Afterward, if a pen touch gesture is made at a position corresponding to the recognized text, the control unit 100 detects the pen touch by means of the second touch panel 150 at step 717 and configures the position of the pen touch as the text recognition area to select the text therein at step 719. At this time, the pen touch can be a contact gesture or a hovering gesture. Afterward, the control unit 100 analyzes the selected text and displays the text data and action items corresponding to the text data according to the analysis result at step 721. Here, the action items can be changed depending on whether the selected text is the linkage text or the normal text. In the case of the linkage text, the action items can be provided as summarized in table 1. If one of the action items is selected by the user, the control unit 100 executes the action corresponding to the selected action item at step 723.

FIGS. 8a and 8b shows the exemplary screen images displayed in the procedure of FIG. 7: FIG. 8a for the case of selecting a phone number and FIG. 8b for the case of selecting normal text.

Referring to FIG. 8a, if the text recognition mode is activated (get text) as shown in the screen image 810, the control unit 100 performs steps 713 and 715 to recognize all text items in the screen image. Recognizing texts using a camera or from a preview screen is well known in the art that can be performed in a variety of ways. At this time, a number of recognized text items can be displayed a specific region (e.g. top region) on the display unit 130. If the user selects one of the text items with a pen touch gesture as shown in the screen image 820, the control unit 100 performs steps 719 and 721 to display the text data of the selected text item and a number of action/executable items corresponding to the text data as shown in the screen image 830, and executes, if the user select one of the action items, the action corresponding to the selected action item.

Referring to FIG. 8b, if the text recognition mode is activated (get text) as shown in the screen image 850, the control unit 100 performs steps 713 and 715 to recognize all text items in the screen image. At this time, a number of recognized text items can be displayed a specific region (e.g. top region) on the screen of the display unit 130. If the user selects one of the text items or all of the recognized texts with a pen touch gesture as shown in the screen image 860, the control unit 100 performs steps 719 and 721 to display the text data of the selected text item as shown in the screen image 870. Alternatively, a list of action/executable items corresponding to the text data can be displayed for further selection by the user.

For selection, the user is capable of selecting plural text items by moving the pen in a diagonal direction as shown in the screen image 860 such that the text data of the plural selected text items are displayed as shown in the screen image 870. In this case, the action items can be displayed at specific position, for example, on the upper region of the screen in the screen image 870. If the user selects one of the action items (web search item in case of screen image 870), the control unit 100 executes the action corresponding to the selected action item as shown in the screen image 880.

The above-described methods according to the present invention can be implemented in hardware, firmware or via the execution of software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

As is apparent from the foregoing, the present invention has an advantage in that a simple pen gesture on a screen, which displays an image from a camera or another source, enables a user to activate a number of functions related to a selected text responsive to the pen gesture on the screen. The portable terminal of the present invention is capable of capturing a preview image provided by a camera as a still image in response to a pen touch gesture and configuring a touch recognition area in response to a subsequent pen touch gesture so as to improve accuracy of pen touch-based text recognition area configuration.

The previous description of the preferred embodiments is provided to enable any person skilled in the art to make or use the present invention. Thus, the specification and drawings are to be regarded in an illustrative rather than a restrictive sense in order to help understand the present invention. It is obvious to those skilled in the art that various modifications and changes can be made thereto without departing from the broader spirit and scope of the invention.

What is claimed is:

1. A text recognition method of a terminal, the method comprising:
    displaying a preview image on a screen of the terminal;
    capturing the preview image as a still image in response to detecting a hover gesture caused by an input device approaching the screen;
    displaying the captured still image;

configuring a recognition area on the still image in response to detecting contact of the input device to the screen, the recognition area based on a location of the detected contact;

recognizing at least one text in the recognition area; and displaying the recognized text and a list of selectable action items corresponding to the text.

2. The method of claim 1, further comprising executing, when one of the action items is selected, an action corresponding to the selected action item.

3. The method of claim 1, wherein the recognition area is defined by a drawing a line on, around or under the at least one text.

4. The method of claim 3, wherein configuring the recognition area comprises configuring, when the line is drawn between an upper and lower text strings, the upper text string above the line as a part of the recognition area.

5. The method of claim 3, wherein configuring the recognition area comprises configuring, when the line is drawn at bottom of at least one letter of a word, the word as a part of the recognition area.

6. A terminal comprising:
a camera providing a preview image;
a touch panel detecting an input gesture;
a display unit displaying the preview image; and
a control unit configured to:
control the camera to capture the preview image as a still image in response to the detecting a hover gesture caused by an input device approaching the touch panel;
control the display unit to display the captured still image;
configure a recognition area on the still image in response to detecting contact of the input device to the touch panel, the recognition area based on a location of the contact;
recognize at least one text in the recognition area; and
control the display unit to display the recognized text and a list of selectable action items corresponding to the text.

7. The terminal of claim 6, wherein the recognition area is defined by a drawing a line on, around or under the at least one text.

8. The terminal of claim 7, wherein the control unit configures, when the line is drawn between an upper and lower text strings, the upper text string above the line as a part of the recognition area.

9. The terminal of claim 7, wherein the control unit configures, when the line is drawn at a bottom of at least one letter of a word, the word as a part of the recognition area.

10. A text recognition method of a terminal, the method comprising:
displaying a preview image on a screen of the terminal;
in response to detecting a hover input of an input device, capturing the preview image as a still image and displaying the captured still image;
recognizing by a processor all text in the captured still image in response to detecting a contact setting a text recognition mode, and removing the captured still image to display a list of recognized texts from the captured still image; and
in response to detecting an input selecting a text from the displayed list, analyzing the selected text to display textual data of the selected text and a list of action items corresponding to a type of the selected text.

11. The method of claim 10, wherein:
when the type is e-mail, the action items comprise at least two of sending an e-mail, adding to a contact list, and sharing textual data;
when the type is a phone number, the action items comprise at least two of calling the phone number, sending a message to the phone number, adding the phone number to the contact list, and sharing the phone number; and
when the type is a uniform resource locator (URL), the action items comprise at least two of opening the URL in a browser application, adding the URL to a bookmark list, and sharing the URL.

* * * * *